(12) United States Patent
Lenglet

(10) Patent No.: US 7,908,111 B2
(45) Date of Patent: Mar. 15, 2011

(54) SENSOR AND METHOD FOR MEASURING POSITION AND SPEED

(75) Inventor: Luc Lucien Marie Lenglet, Levallois-Perret (FR)

(73) Assignee: Eddysense, Cesson (FR)

( * ) Notice: Subject to any disclaimer, the term of this patent is extended or adjusted under 35 U.S.C. 154(b) by 38 days.

(21) Appl. No.: 12/067,717

(22) PCT Filed: Sep. 22, 2006

(86) PCT No.: PCT/FR2006/002175
§ 371 (c)(1),
(2), (4) Date: Jul. 17, 2008

(87) PCT Pub. No.: WO2007/034089
PCT Pub. Date: Mar. 29, 2007

(65) Prior Publication Data
US 2008/0319703 A1    Dec. 25, 2008

(30) Foreign Application Priority Data
Sep. 23, 2005    (FR) ..................................... 05 09784

(51) Int. Cl.
*G01P 11/00*    (2006.01)
*G01C 17/00*    (2006.01)

(52) U.S. Cl. ........................................ 702/142; 702/150
(58) Field of Classification Search ............. 702/94–96, 702/142, 147, 150; 73/488, 514.39; 324/160, 324/179; 700/302, 304
See application file for complete search history.

(56) References Cited

U.S. PATENT DOCUMENTS

| 4,417,208 | A | * | 11/1983 | Hachtel et al. ................ 324/164 |
| 4,450,443 | A |   | 5/1984  | Dolland |
| 4,737,698 | A |   | 4/1988  | McMullin et al. |
| 4,912,660 | A |   | 3/1990  | Kuipers et al. |
| 6,002,250 | A |   | 12/1999 | Masreliez et al. |
| 6,043,644 | A | * | 3/2000  | de Coulon et al. ....... 324/207.18 |
| 2003/0102862 | A1 | * | 6/2003 | Goto et al. ................ 324/207.16 |
| 2006/0022125 | A1 | * | 2/2006 | Nakamoto et al. ......... 250/231.1 |
| 2006/0161378 | A1 | * | 7/2006 | Moller .......................... 702/150 |
| 2008/0066548 | A1 | * | 3/2008 | Jajtic et al. ................. 73/514.39 |

* cited by examiner

*Primary Examiner* — Michael P Nghiem
(74) *Attorney, Agent, or Firm* — Young & Thompson

(57) ABSTRACT

A sensor for detecting the position and speed of a part mobile along at least one measurement direction includes an estimator (38) adapted to provide estimation of position and speed based on a displacement model of the target during a period of observation $T_{obs}$, the model relating the position of the target at a time t included in the period of observation $T_{obs}$, at least to the position and the speed to be estimated.

19 Claims, 3 Drawing Sheets

SENSOR AND METHOD FOR MEASURING POSITION AND SPEED

BACKGROUND OF THE INVENTION

The present invention relates to a sensor and a method for measuring position and speed.

DESCRIPTION OF THE RELATED ART

There exist sensors of position and speed of a movable part comprising:
- at least one excitation inductor suitable for inducing a magnetic excitation field as a function of an excitation current or voltage of this inductor,
- at least one target made of conducting or magnetic material suitable for modifying as a function of its position the magnetic excitation field, this target being secured to the movable part,
- at least one first transducer suitable for transforming the magnetic field modified by the target into an electrical measurement signal, and
- a first estimator able to estimate, on completion of an observation period $T_{obs}$, the position and the speed of the target on the basis of N samples of the electrical measurement signal and of N samples of the excitation current and/or voltage, these samples being taken during the observation period $T_{obs}$ and N being an integer greater than two.

In existing sensors, the magnetic excitation field is an alternating signal of frequency $f_0$ and the estimator is a synchronous demodulator adjusted to the frequency $f_0$ so as to extract the amplitude of the component of frequency $f_0$ from the measured electrical signal. This extracted amplitude is representative of the position of the target.

Synchronous demodulators make it possible to eliminate the additive noise present in the measured electrical signal. By additive noise is meant here the noise related to various spurious phenomena which gets added to or superimposed on the theoretical electrical signal which ought to be obtained in the absence of noise. The elimination of the additive noise by the synchronous demodulator is all the more efficacious the longer the observation period.

Additionally, the position of the target must be substantially constant throughout the observation period. In the converse case, the displacements of the target during the observation period are averaged by the sensor over the observation period, in such a way that the accuracy in the measurement of the position decreases.

So, the greater the speed of displacement of the target, the shorter the chosen observation period must be so as to consider that over this observation period, the position of the target is constant. However, shortening the observation period is detrimental to the elimination of additive noise.

Thus, existing sensors are rather inaccurate for measuring the position of a fast-moving target.

SUMMARY OF THE INVENTION

The invention is aimed at remedying this drawback by proposing a more accurate sensor when the target is moving fast.

The object of the invention is therefore a sensor of position and/or speed of a movable part in which the estimator is able to establish the estimate of the position and/or of the speed as a function of a model of displacement of the target during the observation period $T_{obs}$, this model linking the position of the target at an instant t included in the observation period $T_{obs}$ to at least the position and the speed to be estimated.

By virtue of the use of a displacement model, the estimator of the above sensor takes account of the fact that at least the speed of displacement of the target is not zero during the observation period to establish the estimate of the position and speed of the target. It is therefore no longer necessary to choose an observation period short enough for the speed to be almost zero over this period. Thus, the above sensor can use a longer observation period than that of the existing sensors, so as to obtain a more accurate measurement without however being impeded by the fact that the target is moving during the observation period.

The embodiments of this sensor can comprise one or more of the following characteristics:
- the estimator is able to use a sliding observation period shifted temporally by at most $((N-1)/N)*T_{obs}$ with respect to the previous observation period used to estimate the position and the speed of the target;
- the sensor comprises an excitation unit suitable for generating the excitation current and/or voltage in such a way that the spectral energy density of the magnetic excitation field is spread over several frequencies included in a frequency band whose width is at least $2/(N*T_{obs})$ this frequency band containing at least 80% of the energy of the magnetic excitation field;
- the width of the frequency band is at most equal to $2/T_{obs}$;
- the excitation unit is able to generate a random or pseudo-random sequence of excitation current and/or voltage, in such a way that the N samples of excitation current and/or voltage form a random or pseudo-random series of values, and the estimator is able to estimate the position and/or the speed by projecting a vector $\vec{D}$ formed of N samples of the electrical measurement signal onto at least one vector of a pseudo-inverse matrix of which a term of the form $(M^T M)^{-1}$ is precalculated for several estimates, where M is a matrix, "exponent T" is the matrix transposition function and "exponent -1" is the inverse function;
- at least one second transducer suitable for transforming solely the modifications of the magnetic excitation field that are independent of the displacement of the target along the measurement direction into an electrical reference signal, a second estimator suitable for estimating the value of the multiplicative factor on the basis of the electrical reference signal, and a compensator suitable for compensating for the amplitude variations in the electrical measurement signal that are caused by the variations in the multiplicative factor as a function of the estimated value of this multiplicative factor;
- the compensator comprises a regulator suitable for modifying the magnetic excitation field as a function of the deviation between a reference setpoint and the estimated value of the multiplicative factor;
- the first estimator is able to automatically increase the length of the observation period when the estimate of the speed of the target decreases;
- the target exhibits a break in conductivity that is not collinear with the measurement direction between two materials of different conductivities.

These embodiments of the sensor furthermore exhibit the following advantages:
- using a sliding observation period makes it possible to obtain a faster sensor, capable of estimating the position and the speed at time intervals of less than $((N-1)/N).T_{obs}$;

using a magnetic excitation field whose spectral energy intensity is spread makes it possible to improve the immunity to noise of the measurement;

limiting to $2/T_{obs}$ the width of the frequency band in which the energy spectrum of the magnetic excitation field is spread makes it possible to avoid wasting energy unnecessarily and therefore to reduce the consumption of the sensor;

using a random or pseudo-random sequence of excitation current and/or voltage makes it possible to precalculate a part of the pseudo-inverse matrix, this subsequently accelerating the execution of the calculations for estimating the position and speed;

the use of a compensator makes it possible to increase the accuracy of the measurement;

the use of a regulator makes it possible to fulfill the functions of a compensator and increases the linearity of the sensor;

modifying the length of the observation period as a function of the estimate of the speed makes it possible to increase the sensitivity of the sensor for low speeds; and the use of a target made of materials of different conductivities makes it possible to limit the sensitivity of the sensor to temperature variations.

The subject of the invention is also a method for measuring the position and/or speed of a movable part with the aid of the above sensor, this method comprising, on completion of the observation period $T_{obs}$, a step of estimating the position and/or the speed of the target on the basis of N samples of the electrical measurement signal and of N samples of the excitation current and/or voltage, these samples being taken during the observation period $T_{obs}$ and N being an integer greater than two, this position and/or speed estimate being dependent on a model of displacement of the target during the observation period, this model linking the position of the target at an instant t included in the observation period to at least the position and the speed to be estimated.

BRIEF DESCRIPTION OF THE DRAWINGS

The invention will be better understood on reading the description which follows, given solely by way of example while referring to the drawings in which.

DESCRIPTION OF THE PREFERRED EMBODIMENTS

Figure 1:
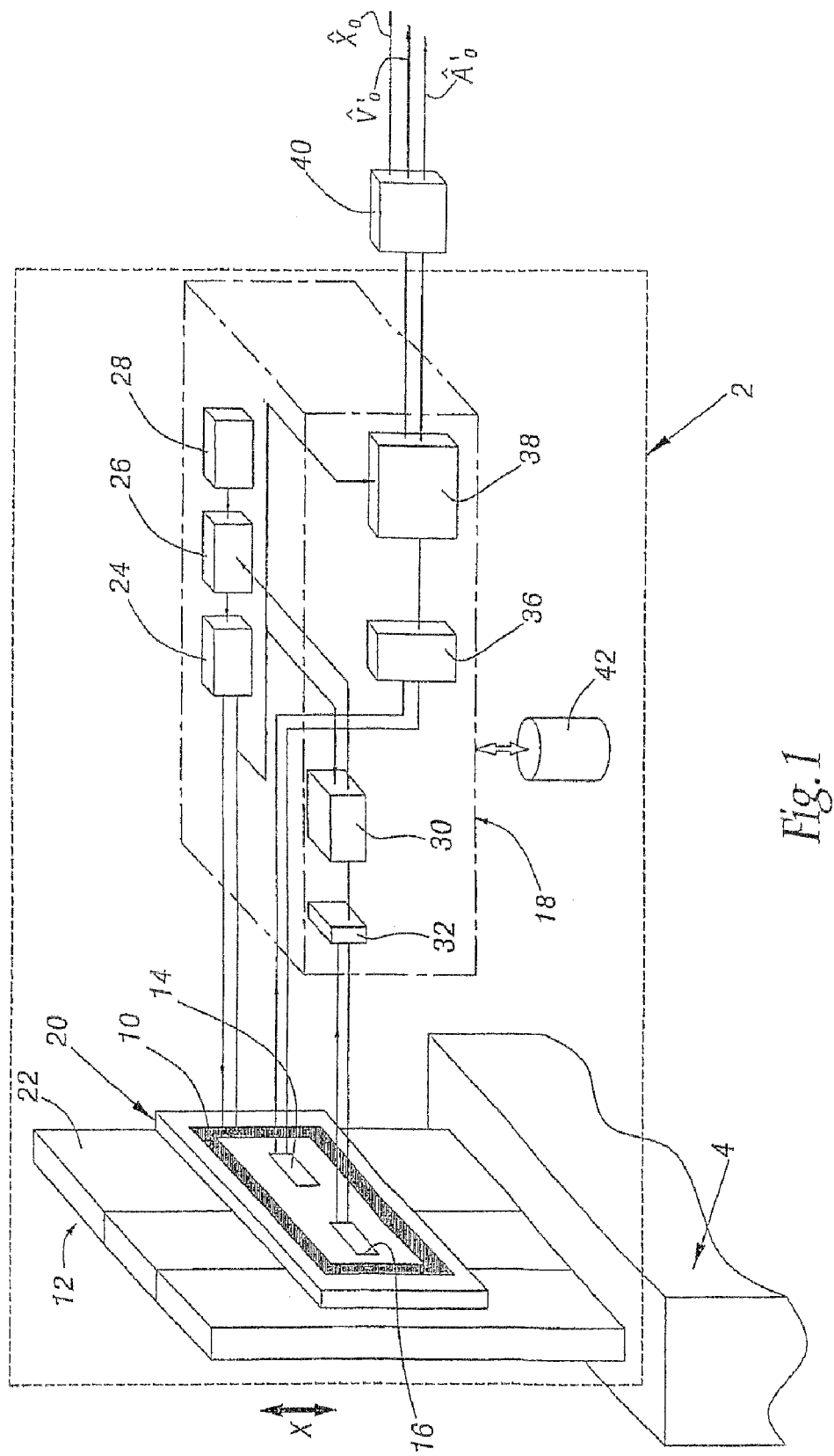
FIG. 1 is a schematic illustration of the architecture of a sensor of position and speed of a movable part.

FIG. 1 represents a sensor 2 of the position and of the speed of a movable part 4.

Here, by way of illustration, the part 4 moves in translation in a vertical direction represented by the arrow X.

The sensor 2 comprises:
an inductor 10 suitable for inducing a periodic or alternating magnetic excitation field;
a target 12 made of conducting materials that is suitable for modifying as a function of its position within the magnetic excitation field;
a transducer 14 suitable for transforming the magnetic field modified by the target 12 into an electrical measurement signal;
a reference transducer 16 suitable for transforming solely the modifications of the magnetic excitation field that are independent of the displacement of the target 12 in the direction X into an electrical reference signal; and
a signal excitation and processing circuit 18, linked to the inductor 10 and to the transducers 14 and 16.

The part 4 and the target 12 are fixed to one another, so as to move in an identical manner in the direction X.

The inductor 10 and the transducers 14 and 16 are fixed to a plane support 20 arranged opposite a plane face 22 of the target 12. The support 20 is mechanically independent of the target 12, in such a way that this target can move freely opposite the support 20 in the direction X. Preferably, the support 20 is made of material that is transparent to electromagnetic fields.

The target 12, the inductor 10 and the transducers 14 and 16 will be described in greater detail with regard to FIG. 2.

The circuit 18 comprises:
a controllable excitation unit 24 suitable for generating an alternating current $I_{exc}$ and a voltage $U_{exc}$ for exciting the inductor 10;
a compensator 26 suitable for compensating for the variations in the electrical measurement signal that are caused by non-additive defects as a function of a reference setpoint and of an estimate of the amplitude of these non-additive defects;
a unit 28 for adjusting the reference setpoint;
an estimator 30 suitable for estimating the value ($\hat{A}_0$) of the non-additive defects on the basis of the electrical signal generated by the transducer 16; and
an analog-digital converter 32 linked between the transducer 16 and inputs of the estimator 30 to transform the electrical reference signal into a digital reference signal.

The non-additive defects give rise here to a variation in the value of a multiplicative factor $\overline{A}$ of the position of the target in the electrical measurement signal.

The excitation unit 24 is suitable for generating the current $I_{exc}$ and the voltage $U_{exc}$ in such a way that the spectral energy densities of the current $I_{exc}$ and the voltage $U_{exc}$ are spread continuously over a frequency band $[f_{min}; f_{max}]$. This frequency band $[f_{min}; f_{max}]$ contains at least 80%, and preferably 90%, of the energy of the current $I_{exc}$ and of the voltage $U_{exc}$. In this way, the spectral energy density of the magnetic excitation field is also spread continuously over the same frequency band, in such a way that at least 80%, and preferably 90%, of the energy of the magnetic excitation field lies in this frequency band $[f_{min}; f_{max}]$.

The width of the frequency band is chosen equal to $2/T_{obs}$, where $T_{obs}$ is a predefined observation period. The frequency $f_{min}$ is nonzero and preferably greater than 10 kHz. The middle frequency $f_{mid}$ of the band $[f_{min}; f_{max}]$ is equal to the inverse of the response time of the sensor. Thus, the position of the band $[f_{min}; f_{max}]$ will be chosen as a function of the response time desired or possible for this sensor.

The frequency $f_{mid}$ is given by the following relation:

$$f_{mid} = (f_{min} + f_{max})/2 \tag{1}$$

The compensator 26 of non-additive defects is, for example, here a regulator suitable for controlling the unit 24 as a function of the deviation between the reference setpoint delivered by the unit 28 and of an estimate $\hat{A}_0$ of the value of the multiplicative factor $\underline{A}$ delivered by the estimator 30.

For this purpose, the compensator 26 has an input connected to the unit 28, another input connected to an output of the estimator 30 and a control output connected to an input of the unit 24.

The estimator 30 has an input connected to an output of the converter 32 to receive the digital reference signal and an input connected to the outputs of the unit 24 to receive the voltage $U_{exc}$.

The circuit 18 also comprises:
- an analog-digital converter 36 linked to the transducer 14 to convert the electrical measurement signal into a digital measurement signal; and
- an estimator 38 suitable for calculating the estimate $\hat{X}_0$ of the position and the estimate $\hat{V}_0$ of the speed of the target 12 on the basis of the digital measurement signal and the voltage $U_{exc}$.

The estimator 38 therefore has an input linked to an output of the converter 36, an input linked to the outputs of the unit 24, and two outputs for delivering the estimates $\hat{X}_0$ and $\hat{V}_0$ to circuits outside the sensor 2.

Here, by way of illustration, the estimates $\hat{X}_0$ and $\hat{V}_0$ are delivered to the input of a unit 40 for additional processings that is suitable for calculating with greater accuracy a new estimate $\hat{V}'_0$ of the speed of the target and an estimate $\hat{A}'_0$ of the acceleration of the target. The unit 40 also delivers as output the estimate $\hat{X}_0$.

Figure 3:
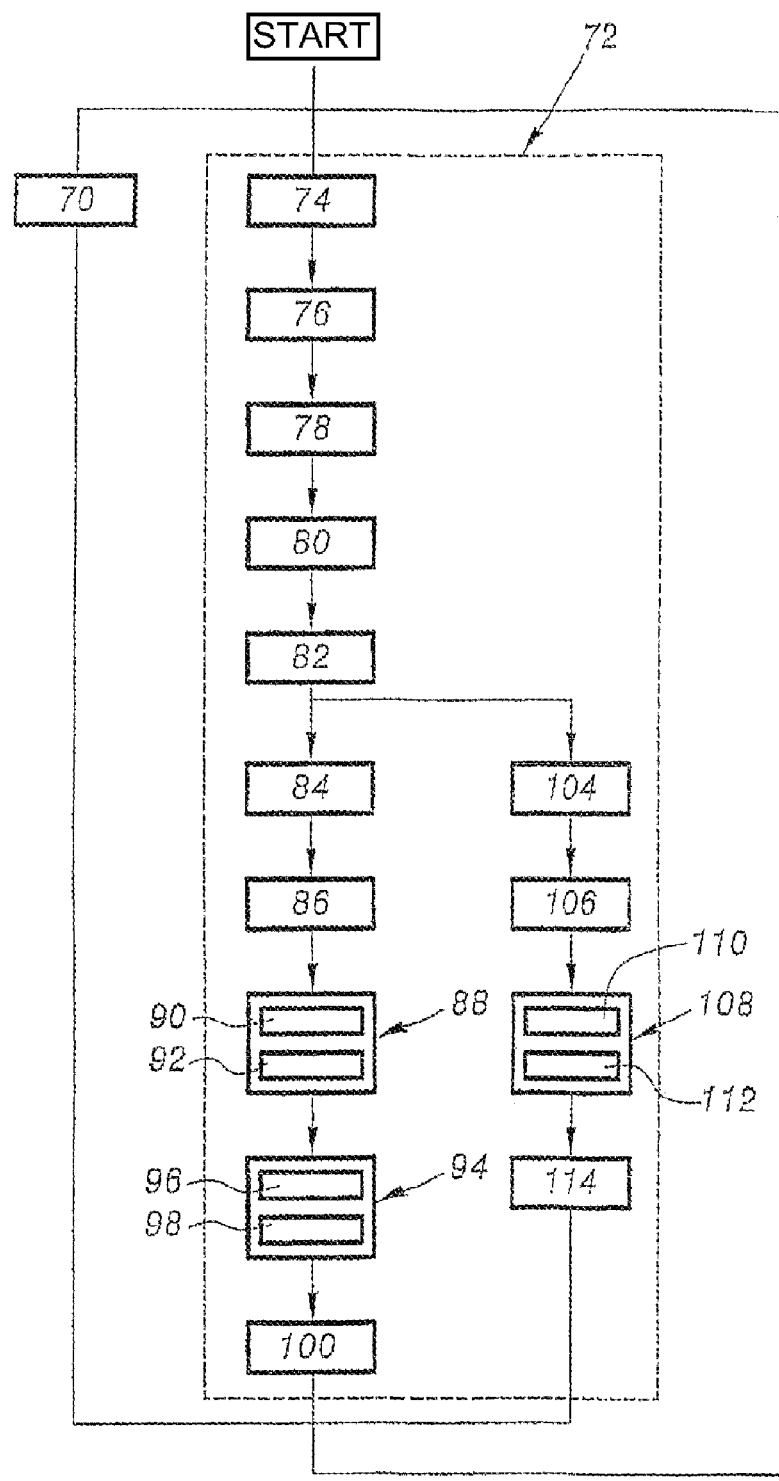
FIG. 3 is a flowchart of a method for measuring the position of a movable part with the aid of the sensor of FIG. 1.

The details of the various functions of the units of the circuit 18 will be apparent on reading the description offered with regard to FIG. 3.

The circuit 18 is also associated with a memory 42 intended to store the samples forming the digital measurement and reference signals as well as the whole set of data required for the calculations to be executed by the estimators 30 and 38.

Figure 2:
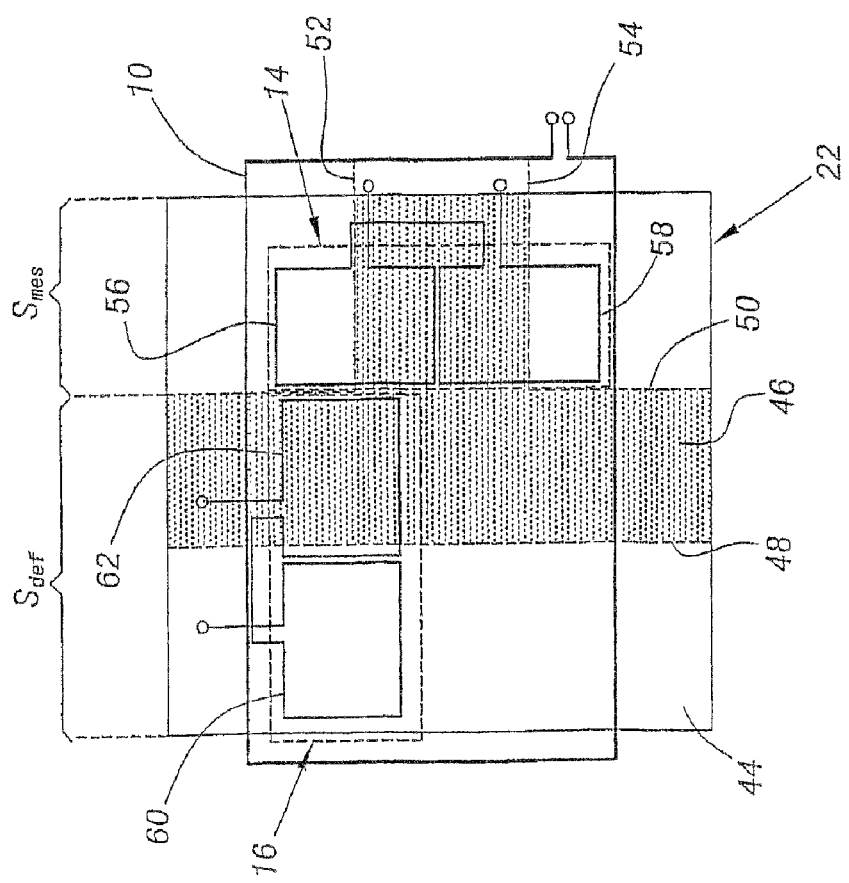
FIG. 2 is an end-on view of a target, of the inductor and of the transducers of the sensor of FIG. 1.

FIG. 2 represents the face 22 of the target 12 arranged opposite a corresponding surface of the support 20. FIG. 2 also represents the arrangement of the inductor 10 and of the transducers 14 and 16 opposite this face 22.

In FIG. 2, the elements already described with regard to FIG. 1 bear the same numerical references.

The face 22 is parallel to the vertical direction X of displacement of the target 12 and also parallel to the surface of the support 20.

This face 22 is divided into two sections $S_{def}$ and $S_{mes}$ arranged one alongside the other and extending vertically. A vertical limit 50 separates these two sections.

The section $S_{def}$ is made by juxtaposing a material 44 of conductivity $C_1$ and a material 46 of electrical conductivity $C_2$ (represented by shading in FIG. 2).

The materials 44 and 46 are arranged one alongside the other so as to form a break 48 in conductivity extending parallel to the direction X. For examples the materials 44 and 46 form two bands of constant width extending vertically parallel to the direction X.

The materials 44 and 46 are chosen in such a way that the conductivities $C_1$ and $C_2$ are very different from one another. Preferably, the ratio of the conductivity $C_2$ to the conductivity $C_1$ is greater than or equal to 1000. For example, here, the material 44 is an electrical insulant whose conductivity $C_1$ is less than $10^{-10}$ S/m while the material 46 is an electrical conductor whose conductivity $C_2$ is greater than $10^6$ S/m, such as copper.

The section $S_{mes}$ is also made from the same two materials 44 and 46. However, in the section $S_{mes}$ the material 46 is laid out so as to form a horizontal band of constant width extending in a direction Y perpendicular to the direction X and parallel to the surface of the support 20.

The material 44 is arranged in the section $S_{mes}$ so as to form two horizontal bands extending in the direction Y and juxtaposed respectively above and below the horizontal band formed with the aid of the material 46.

This layout of the materials 44 and 46 in the surface $S_{mes}$ makes it possible to create two breaks 52, 54 in conductivity that are not collinear with the direction X. Here, these breaks in conductivity 52, 54 are parallel to the direction Y.

The inductor 10 is here formed of a coil with one or more turns whose winding axis is perpendicular to the face 22. The section of the inductor 10 opposite the face 22 is extensive enough to make it possible to induce a magnetic field of substantially uniform excitation in the target 12.

The transducers 14 and 16 are arranged inside the windings of the inductor 10.

The transducer 14 is arranged at least opposite one of the breaks in horizontal conductivity 52 or 54, so as to be sensitive to the displacements of these breaks in conductivity in the direction X.

The transducer 16 is conversely arranged opposite the break 48, so as to be insensitive to the displacements of the target 12 in the direction X.

The transducers 14 and 16 are each formed by coils mounted in a differential manner.

More precisely, the transducer 14 is formed of two coils 56 and 58 linked in series but wound in opposite directions, in such a way that if the same magnetic field crosses the coils 56 and 58, the electrical signal generated by the transducer 14 is zero. Such a transducer makes it possible to obtain a linear operating zone around the zero magnetic field.

Here, the coil 56 is mounted opposite the break in conductivity 52, while the coil 58 is mounted opposite the break in conductivity 54, so as to increase the sensitivity of the transducer 14 to the displacements of the target 10 in the direction X.

In a similar manner, the transducer 16 is formed of two coils 60 and 62 mounted in a differential manner.

The coil 60 is arranged so as to be solely opposite the material 44 and the coil 62 is placed so as to be opposite the break 48, whatever the displacements of the target 12 in the direction X.

The terminals for linking the inductor 10 and the transducers 14 and 16 to the circuit 18 are represented by small circles in FIG. 2.

The relations and notations which are used subsequently in this description will now be introduced.

The electromotive force $e_{mes}(t)$ developed by the transducer 14 at an instant t is given by the following relation:

$$e_{mes}(t) = A \frac{dI_{exc}(t)}{dt} f(X) + \text{noise}(t) \quad (2)$$

where:

A is the multiplicative factor whose amplitude varies as a function of non-additive defects;

$$\frac{dI_{exc}(t)}{dt}$$

is the first derivative with respect to time of the current $I_{exc}(t)$;

f(X) is a transduction function giving the image of the flux across the transducer 14 as a function of the position X of the target 12; and "noise(t)" is the additive noise which is superimposed on the signal theoretically obtained in the absence of additive noise.

The value of the factor A depends, for example, on the geometry of the target 12, the conductivities $C_1$ and $C_2$, and the distance separating the transducer 14 from the surface of the target 12 ("Lift Off").

The electromotive force $e_{def}(t)$ developed by the transducer 16 at the instant t is given by the following relation:

$$e_{def}(t) = A \frac{dI_{exc}(t)}{dt} + 1 \text{ noise}(t) \tag{3}$$

where the various terms of this relation have already been defined with regard to relation (2).

It will be rioted that the electromotive force $e_{def}(t)$ does not depend on the position X of the target 12 since the break in conductivity 48 opposite the transducer 16 is parallel to the direction X.

The transduction function f(X) modulates the amplitude of the electrical measurement signal as a function of the position X, this function f(X) can be modeled experimentally in a static state. For example, the target 12 is brought to a position $x_1$ and maintained at this position while the amplitude (i.e. the peak value) of the electromotive force $e_{mes}(t)$ is measured. Thereafter, the target is displaced to a position $x_2$ and the previous operations are repeated.

By way of illustration, subsequently in this description, it is assumed that the function f(X) is defined by the following relation:

$$f(x) = \alpha X \tag{4}$$

where $\alpha$ is an experimentally measured constant coefficient.

The displacement of the target 12 during the observation period $T_{obs}$ is modeled with the aid of a displacement model. This displacement model is defined by the following general relation:

$$X(t) = g\left[X(0), \frac{\partial X}{\partial t}(0), \ldots \frac{\partial^i X}{\partial t^i}(0), t\right] \tag{5}$$

$$t \in [-T_{obs}, 0]$$

where:
X(t) is the position of the target along the direction X at the instant t belonging to the observation period $[-T_{obs}; 0]$;
g is the displacement model;

$$X(0), \frac{\partial X}{\partial t}(0), \ldots \frac{\partial^i X}{\partial t^i}(0)$$

correspond respectively to the position, the speed, the second derivative, . . . , the $i^{th}$ derivative of the position at the instant t=0, that is to say at the end of the observation period. This position and this or these derivatives are those to be estimated.

The model of displacement of the target during the observation period $T_{obs}$ can, for example, be obtained by polynomial expansion. In that case, the model will be of the following form:

$$X(t) = X(0) + \sum_{i=1}^{i=N} \frac{\partial^i X}{\partial t^i}(0) \frac{t^i}{i!} \tag{6}$$

$$t \in [-T_{obs}, 0]$$

Subsequently in the description, it is assumed that the target 12 can move at high speed during the observation period but that the acceleration during this same observation period is negligible. Under these conditions, the displacement model adopted is the following:

$$X(t) = X(0) + V(0)t \tag{7}$$

where X(0) and V(0) are respectively the position and speed of the target at the instant t=0.

It will be pointed out that this displacement model conveys the knowledge possessed by the designer of the sensor 2 regarding the displacements of the target 12 during the period $T_{obs}$.

The sampling frequency of the analog-digital converters 32 and 36 is denoted $f_{ech}$. This frequency $f_{ech}$ is greater than $5/T_{obs}$ and preferably greater than $100/T_{obs}$ or $1000/T_{obs}$. The number N of samples taken during the period $T_{obs}$ is therefore greater than 5 and preferably greater than 100 or 1000. N must be greater than 2 at the minimum.

The sampling instants are denoted $t_i$, where t0 corresponds to the current instant (t=0), that is to say to the end of the observation period $T_{obs}$, while $t_{N-1}$ corresponds to the start of the observation period, that is to say to the instant $-T_{obs}$.

$\vec{D}$ is a vector of the N successive samples of the electrical measurement signal. $\vec{D}$ is defined by the following relation:

$$\vec{D} = \begin{pmatrix} D_{N-1} \\ D_{N-2} \\ \vdots \\ D_1 \\ D_0 \end{pmatrix} \tag{8}$$

where $D_i$ represents the value of the electrical measurement signal sampled at the instant $t_i$.

$\vec{E}$ is a vector of the N successive samples of the time derivative of the current $I_{exc}$. This vector is defined by the following relation:

$$\vec{E} = \begin{pmatrix} E_{N-1} \\ E_{N-2} \\ \vdots \\ E_1 \\ E_0 \end{pmatrix} \tag{9}$$

where $E_i$ is the sample of the time derivative of the current $I_{exc}$ at the sampling instant $t_i$.

$\vec{B}$ is a vector of the N successive noise samples, defined by the following relation:

$$\vec{B} = \begin{pmatrix} B_{N-1} \\ B_{N-2} \\ \vdots \\ B_1 \\ B_0 \end{pmatrix} \quad (10)$$

where $B_i$ represents the amplitude of the additive noise at the sampling instant $t_i$. Unlike the vectors $\vec{D}$ and $\vec{E}$, this vector $\vec{B}$ is random.

By using relations (2), (4) and (7), the following matrix relation linking the vectors $\vec{D}$ and $\vec{B}$ can be written:

$$\vec{D} = M \cdot \vec{P} + \vec{B} \quad (11)$$

$$= \begin{pmatrix} \alpha AE_{N-1} & -T_{obs} \cdot \alpha AE_{N-1} \\ \alpha AE_{N-2} & -\frac{(N-2)T_{obs}}{N-1} \cdot \alpha AE_{N-2} \\ \vdots & \vdots \\ \alpha AE_1 & \frac{-T_{obs}}{N-1} \cdot \alpha AE_1 \\ \alpha AE_0 & 0 \end{pmatrix} \begin{pmatrix} X(0) \\ V(0) \end{pmatrix} + \vec{B}$$

where $\vec{P}$ is defined by the following relation:

$$\vec{P} = \begin{bmatrix} X(0) \\ V(0) \end{bmatrix} \quad (12)$$

The matrix M is defined in relation (11).

It is possible to determine the estimates $\hat{X}_0$ and $\hat{V}_0$ respectively of the position and speed of the target 12 in the least squares sense by using the so-called "pseudo-inverse" procedure. This procedure is for example described in the following bibliographic reference:

R. M. Pringle, A. A. Rayner, "Generalized Inverse Matrices", London, Griffin, 1971.

The estimates $\hat{X}_0$ and $\hat{V}_0$ are obtained with the aid of the following relation:

$$\hat{P} = (M^T M)^{-1} M^T D = QD \quad (13)$$

where:
$\hat{P}$ is the estimate vector,
Q is the pseudo-inverse matrix,
$^T$ denotes the transposition function,
$^{-1}$ denotes the matrix inverse function.

The estimate vector $\hat{P}$ is defined by the following relation:

$$\hat{P} = \begin{bmatrix} \hat{X}_0 \\ \hat{V}_0 \end{bmatrix} \quad (14)$$

The pseudo-inverse matrix Q is defined by the following relation:

$$Q = (M^T M)^{-1} M^T = [\vec{Q}_1; \vec{Q}_2] \quad (15)$$

where $\vec{Q}_1$ and $\vec{Q}_2$ are orthogonal vectors corresponding respectively to the first and to the second column of the matrix Q.

A model h(t) for the evolution over time of the value of the multiplicative factor A is also defined with the aid of the following relation:

$$A = h(t) \quad (16)$$

It will be assumed here that the variations in the value of the multiplicative factor A exhibit a negligible acceleration. This is represented by the following model:

$$h(t) = A(0) + VA(0)t \quad (17)$$

where:
A(0) is the value of the multiplicative factor at the sampling instant $t_0$, and
VA(0) is the rate of evolution of the amplitude of the multiplicative factor at the sampling instant $t_0$.

$\vec{D}_d$ is a vector of the N successive samples of the electrical reference signal defined by the following relation:

$$\vec{D}_d = \begin{bmatrix} D_{dN-1} \\ D_{dN-2} \\ \vdots \\ D_{d2} \\ D_{d1} \\ D_{d0} \end{bmatrix} \quad (18)$$

where $D_{di}$ represents the value of the electrical reference signal at the instant $t_i$.

$\vec{B}_d$ is a vector of additive noise samples present in the electrical reference signal and is defined by the following relation:

$$\vec{B}_d = \begin{bmatrix} B_{dN-2} \\ B_{dN-1} \\ \vdots \\ B_{d2} \\ B_{d1} \\ B_{d0} \end{bmatrix} \quad (19)$$

where $B_{di}$ is the amplitude of the additive noise at the sampling instant $t_i$. Unlike the vector $\vec{D}_d$, the vector $\vec{B}_d$ is random.

In a similar manner to what was described with regard to relation (11) it is possible with the aid of relations (3) and (17) to establish the following matrix relation:

$$\vec{D}_d = M_d \cdot \vec{P}_d + \vec{B}_d \quad (20)$$

$$= \begin{bmatrix} E_{N-1} & -T_{obs}E_{N-1} \\ E_{N-2} & -\frac{(N-2)T_{obs}}{N-1}E_{N-2} \\ \vdots & \vdots \\ E_1 & -\frac{T_{obs}}{N-1}E_1 \\ E_0 & 0 \end{bmatrix} \begin{bmatrix} A(0) \\ VA(0) \end{bmatrix} + \vec{B}_d$$

where $P_d$ is defined by the following relation:

$$P_d = \begin{bmatrix} A(0) \\ VA(0) \end{bmatrix} \quad (21)$$

As previously, it is possible to determine the estimates $\hat{A}_0$ and $\hat{V}A_0$ respectively of the value and of the rate of variation of the multiplicative factor $\underline{A}$ minimizing the deviation between the model represented by relation (20) and the samples of the electrical reference signal by using the pseudo-inverse procedure.

According to this procedure, these estimates are given by the following relation:

$$\hat{P}_d = (M_d^T M_d)^{-1} M_d^T D = QD \quad (22)$$

where:
the matrix $M_d$ is defined in relation (20), and
the matrix $Q_d$ is the pseudo-inverse matrix.
The vector $\hat{P}_d$ is defined by the following relation:

$$\hat{P}_d = \begin{bmatrix} \hat{A}_0 \\ \hat{V}A_0 \end{bmatrix} \quad (23)$$

The pseudo-inverse matrix $Q_d$ is defined by the following relation:

$$Q_d = (M_d^T M_d)^{-1} M_d^T = [\vec{Q}_{d1}; \vec{Q}_{d2}] \quad (24)$$

where:
$\vec{Q}_{d1}$ and $\vec{Q}_{d2}$ correspond to the vectors defined respectively by the first and second columns of the matrix $Q_d$.

The various parameters, that are known in advance, of the above relations are recorded in the memory 42. For example, the memory 42 contains the value of the following parameters: $\alpha$, N, $T_{obs}$ and A. A is known since the latter is equal to the reference setpoint of the unit 28.

The memory 42 also contains matrices K and $K_d$ defined by the following relations:

$$K = (M^T M)^{-1} \quad (25)$$

$$K_d = (M_d^T M_d)^{-1} \quad (26)$$

The matrices K and $K_d$ are independent of the values of the vector $\vec{E}$ when the latter is formed of samples forming a random or pseudo-random series.

The value of the period $T_{obs}$ chosen typically lies between 1 s and 100 µs, and, preferably, it lies between 0.3 ms and 500 µs for a target moving at a speed greater than 1 m/s and preferably at a speed greater than 100 m/s. Here, the value of the period $T_{obs}$ is dependent on the estimate $\hat{V}_0$. More precisely, if the estimate $\hat{V}_0$ increases, the period $T_{obs}$ is automatically shortened and when the estimate $\hat{V}_0$ decreases, the period $T_{obs}$ is automatically lengthened. This task is, for example, carried out by the estimator 38.

The operation of the sensor 2 will now be described with the aid of FIG. 3.

Continually, during a step 70, the compensator 26 compares the reference setpoint delivered by the unit 28 with the estimate $\hat{A}_0$ delivered by the estimator 30. As a function of the deviation between this setpoint and this estimate, the compensator 26 controls the excitation unit 24, so as to maintain the amplitude of the multiplicative factor $\underline{A}$ equal to the reference setpoint.

At each current sampling instant $t_0$, the circuit 18 undertakes a phase 72 of processing the electrical signals delivered by the transducers 14 and 16.

At the start of the phase 72, during a step 74, the transducers 14 and 16 transform the magnetic excitation field modified by the target 12 into an electromotive force $e_{mes}(t)$ and $e_{def}(t)$, respectively. During step 74, these electromotive forces are sampled at the instant $t_i$ by the converters 32 and 36, so as to obtain the values $e_{mes}(t_0)$ and $e_{def}(t_0)$.

During a step 76, these samples $e_{mes}(t_0)$ and $e_{def}(t_0)$ are recorded in the memory 42 as values $D_0$ and $D_{d0}$.

During a step 78, the estimator 38 then constructs on the basis of the samples recorded in the memory the vector $\vec{D}$ and the estimator 30 constructs the vector $\vec{D}_d$.

During a step 80, the circuit 18 reads off the value $E_0$. Accordingly, the circuit 18 reads off the value of the voltage $U_{exc}$ at the instant $t_0$ and stores it as value of $E_0$. Specifically, the voltage $U_{exc}$ is proportional to the derivative of the current $I_{exc}$ with respect to time and to the value of the inductance of the inductor 10.

Thereafter, during a step 82, the estimator 38 constructs the vector $\vec{E}$ and records it in the memory 42.

During a step 84, the estimator 38 calculates the new matrix M on the basis of the vector $\vec{E}$, of the value of the coefficient $\alpha$, of the value A, and of the observation period $T_{obs}$ recorded in the memory 42.

Thereafter, during a step 86, the estimator 38 calculates the pseudo-inverse matrix Q on the basis of relation (15). More precisely, during this step 86, the estimator 38 multiplies the matrix K prerecorded in the memory 42 by the matrix $M^T$.

Thus, on completion of step 86, the vectors $\vec{Q}_1$ and $\vec{Q}_2$ are known.

On the basis of the matrix Q, during a step 88, the estimator 38 estimates the position and the speed of the target. More precisely, during an operation 90, the estimator 38 projects the vector $\vec{D}$ onto the vector $\vec{Q}_1$ to obtain the estimate $\hat{X}_0$. During an operation 92, the estimator 38 also projects the vector $\vec{D}$ onto the vector $\vec{Q}_2$ to obtain the estimate $\hat{V}_0$.

The estimates $\hat{X}_0$ and $\hat{V}_0$ are delivered by the sensor 2 to the additional-processing unit 40.

During a step 94, the unit 40 hones the estimates delivered by the sensor 2. More precisely, during an operation 96, the unit 40 verifies whether the estimate $\hat{V}_0$ is not less than a predetermined threshold $S_1$. In the affirmative, the unit 40 calculates a more accurate estimate $\hat{V}'_0$ of the speed of the target on the basis of the estimates $\hat{X}_0, \hat{X}_1, \ldots, \hat{X}_m$ where the index m is an integer strictly greater than N. $\hat{X}_1$ represents the value of the estimate of the position of the target delivered by the sensor 2 at the sampling instant $t_i$.

In the converse case, that is to say if the estimate $\hat{V}_0$ is greater than the threshold $S_1$, said estimate is not modified, so that $\hat{V}'_0$ is equal to $\hat{V}_0$. The operation 96 makes it possible to improve the accuracy of the speed estimate if the value estimated of this speed by the sensor 2 is low. For example, the threshold $S_1$ is equal to 0.01 m/s.

During an operation 98, the unit 40 also calculates an estimate $\hat{A}'_0$ of the acceleration of the target 12 on the basis of the m previous estimates $\hat{X}_1$ of the position and/or of the speed $\hat{V}_1$.

Thereafter, during a step 100, the unit 40 delivers the estimates $\hat{X}_0$, $\hat{V}'_0$ and $\hat{A}'_0$.

In parallel with steps 84 to 100, the estimator 30 estimates the value of the multiplicative factor A at the instant $t_0$.

More precisely, during a step 104, the estimator 30 calculates the matrix $M_d$ on the basis of the vector $\vec{E}$ stored. Thereafter, during a step 106, the estimator 30 calculates the pseudo-inverse matrix $Q_d$ as defined in relation (24). For this purpose, during step 106, the estimator 30 multiplies the stored matrix $K_d$ by the transpose of the matrix $M_d$.

Thereafter, during a step 108, the estimator 30 estimates the value $\hat{A}_0$ and the rate $\hat{V}A_0$ of variation of the multiplicative factor A. More precisely, during an operation 110, the estimator 30 projects the vector $\vec{D}_d$ onto the vector $\vec{Q}_{d1}$ to obtain the estimate $\hat{A}_0$. Likewise, during an operation 112, the estimator 30 projects the vector $\hat{D}_d$ onto the vector $\hat{Q}_{d2}$ to obtain the estimate $\hat{V}A_0$.

Thereafter, during a step 114, the estimator 30 dispatches the estimate $\hat{A}_0$ to the compensator 26 which uses this estimate during step 70 to keep the value of the factor A constant.

Phase 72 is repeated at each sampling instant, in such a way that a new estimate of the position, of the speed and of the acceleration of the target 12 is constructed at each new sampling instant.

Figure 4:
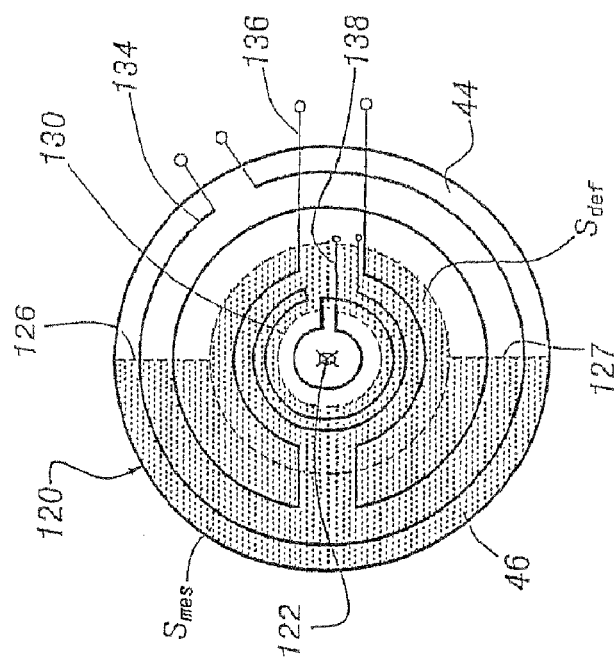
FIG. 4 is a schematic illustration of another embodiment of a target for measuring a position and an angular speed.

FIG. 4 represents a target 120 adapted to estimate the position and the angular speed of a part rotating about an axis 122.

The target 120 here has the form of a disk divided into zones formed from materials of various conductivities and arranged one with respect to the other so as to form two sections $S_{mes}$ and $S_{def}$.

$S_{mes}$ is here an annulus whose left half is formed for example by the material 46 while the right half is formed with the aid of the material 44. The juxtaposition of these two materials 44 and 46 creates two breaks in conductivity 126 and 127 which extend radially.

The surface $S_{def}$ is placed at the center of the surface $S_{mes}$. This surface $S_{def}$ is formed by a circular central pad made from the material 44. This central pad is surrounded by a complete annulus made with the aid of the material 46. Such a configuration of the surface $S_{def}$ creates a break 130 in conductivity that is circular and centered about the axis 122.

FIG. 4 also represents an inductor 134 suitable for creating a magnetic field of substantially uniform excitation and two differential transducers 136 and 138.

The transducer 136 comprises, as was described with regard to FIG. 2, two coils mounted in series and wound in opposite directions to one another, in such a way that when these two coils are crossed by the same magnetic field, the electrical signal at the terminals of the transducer 136 is zero.

The transducer 136 is arranged opposite the surface $S_{mes}$, so as to deliver an electrical measurement signal as a function of the rotational displacement of the breaks in conductivity 126 and 127.

Like the transducer 136, the transducer 138 is formed of two coils linked in series and wound in opposite directions. However, the transducer 136 is placed opposite the surface $S_{def}$, so as to deliver an electrical reference signal independent of the angular position of the disk 120.

The inductor 134 plays the role of the inductor 10 of FIG. 1 and the transducers 136 and 138 play respectively the role of the inductors 14 and 16 of FIG. 1. The operation of a position and angular speed sensor using the target 120 will therefore not be described here in greater detail.

Numerous other embodiments are possible.

For example, it is not necessary for the transducers 14 and 16 or 136 and 138 to be formed of two coils mounted in a differential manner.

The material $C_1$ described as insulating can, for example, be air, thereby simplifying the fabrication of the target 12 or 120.

If the non-additive disturbances play a rather unimportant role in the accuracy of the measurement, the sensor 2 can be simplified by dispensing with the transducer 16 as well as the converter 32, the estimator 30, the compensator 26 and the adjustment unit 28.

The compensation of the non-additive defects has been described here as being carried out with the aid of a compensator 26 making it possible to keep the value of the multiplicative factor A constant. As a variant, such a compensation can also be carried out by dividing the electromotive force $e_{mes}(t)$ by the amplitude of the electromotive force $e_{def}(t)$.

In the latter case, a voltage divider is introduced between on the one hand, the converter 36 and the estimator 30 and on the other hand, the estimator 38. This voltage divider performs the division of the electromotive force $e_{mes}(t)$ by the amplitude of the electromotive force $e_{def}(t)$ obtained as output from the estimator 30. The compensator 26 and the adjustment unit can then be dispensed with.

It is also possible to compensate for the non-additive defects by simply multiplying the electromotive force $e_{mes}(t)$ by a finite expansion of the amplitude of the inverse of $e_{def}(t)$. A finite expansion such as this can take the following form:

$$(1-\epsilon)/A$$

The transduction function f(X) has been described as being solely proportional to X. However, other forms of relations are possible. For example, the transduction function can have the following form:

$$f(x) = \alpha X + \beta$$

where $\alpha$ and $\beta$ are known coefficients.

Here the coefficients of the function f(X) have been described as constant. However, should these coefficients not be constant, it is possible to provide a unit for adjusting the value of these coefficients as a function, for example, of the estimate $\hat{X}_0$.

The inductor and the transducer 14 have been described as being formed with the aid of distinct windings. As a variant, the same winding is used at one and the same time in the guise of inductor suitable for creating the magnetic excitation field and in the guise of transducer for measuring the magnetic excitation field modified by the target.

Here, the electrical breaks in conductivity have been described as being formed by juxtaposing materials of different electrical conductivities. As a variant, these electrical breaks in conductivities can be obtained by forming ribs or scores on the surface of a single conducting material. Also as a variant, these breaks in conductivity can, if desirable, be buried inside the conducting material.

If the acceleration of the target is not negligible during the period $T_{obs}$, it is possible to add a term to the displacement model described here representing the acceleration of the target during the observation period. Other terms representing higher-order derivatives of the position with respect to time can also be added to the displacement model if their contribution is not negligible for the estimate of the position of the target. In the latter cases, the estimator will then deliver an estimate for the position and the speed of the target as well as an estimate for these higher-order derivatives of the position.

Here, the displacement model has been described as being obtained with the aid of a polynomial decomposition. However, if the displacement of the target comprises vibratory modes, a displacement model can be obtained with the aid of Fourier series.

Here, given that the winding axis of the transducer 16 is perpendicular to the face 22 of the target, this transducer 16 is sensitive solely to the non-additive defect in this direction perpendicular to the face 22. As a variant, one or more other additional transducers having winding axes that are not collinear with that of the transducer 16 are provided so as to measure the non-additive defect amplitude in non-collinear directions.

Likewise, several excitation inductors may be provided.

It is also possible to use several transducers such as the transducer 14, for example, to improve the angular resolution.

The sections $S_{mes}$ and $S_{def}$ have been described as being adjacent to one another. As a variant, these surfaces are non-adjacent and, for example, borne by targets spaced mutually apart spatially.

It is not necessary that the excitation inductor be arranged on the same support as that used to support the transducers 14 and 16. For example, the excitation inductor can be placed on the other side of the target with respect to the side where the transducers 14 and 16 are situated.

It is also possible to control the unit 24 in such a way as not to spread the spectrum of the magnetic excitation field. For example, in that case, the excitation current $I_{exc}$ is a pure sinusoid at a frequency $f_0$. In this situation, the estimator 30 is replaced with a synchronous demodulator able to filter the electrical signal received so as to extract therefrom the amplitude of the component of frequency $f_0$.

If the vector $\vec{E}$ then repeats at regular intervals $T_e$, it is possible to estimate the position every interval $T_e$ only. In this way, since at the end of the interval $T_e$, the vector $\vec{E}$ is identical to that at the start of this interval, it is not necessary to recalculate the pseudo-inverse matrix, thereby making it possible to accelerate the calculations.

The target 12 has been described here as being fixed to the movable part. As a variant, the target 12 is integral with the movable part and forms only one single block with this part.

The spectral spreading of the magnetic excitation field has been described as being continuous. As a variant, it can be discrete.

It is also possible to calculate the values $E_i$ instead of reading them off at the output of the excitation unit 24. It is possible to calculate the values $E_i$ when the evolution over time of the magnetic excitation field is known in advance. This may, for example, be the case when the magnetic excitation field is periodic.

As a variant, the target can be made of magnetic material.

The sensor described above can be adapted to deliver solely an estimate of the position of the target or solely an estimate of the speed of the target. In this variant, the vector $\vec{D}$ is then projected solely either onto the vector $\vec{Q}_1$ or onto the vector $\vec{Q}_1$ depending on the estimate that one seeks to obtain.

The invention claimed is:

1. A sensor of position and speed of a movable part that can move along at least one measurement direction, the sensor comprising:
    at least one excitation inductor (10) suitable for inducing a magnetic excitation field as a function of an excitation current or voltage of the inductor,
    at least one target (12) made of conducting or magnetic material suitable for modifying the magnetic excitation field as a function of a position of the target, the target being secured to the movable part,
    at least one first transducer (14) suitable for transforming the magnetic excitation field modified by the target into an electrical measurement signal, and
    a first estimator (38) able to estimate, on completion of an observation period $T_{obs}$, the position and speed of the target on the basis of N samples of the electrical measurement signal and of N samples of the excitation current and voltage, these samples being taken during the observation period $T_{obs}$ and N being an integer greater than two,
    wherein the estimator, using a model of displacement of the target during the observation period $T_{obs}$, is able to establish the estimate of the position and of the speed of the movable part as a function of the model of displacement of the target during the observation period $T_{obs}$, the model of displacement relating the position of the target at an instant t included in the observation period $T_{obs}$ to at least the position and the speed of the movable part to be estimated, in which the displacement model is defined by the following relation:

$$X(t) = g\left[X(0), \frac{\partial X}{\partial t}(0), \ldots \frac{\partial^i X}{\partial t^i}(0), t\right] \qquad (5)$$

$$t \in [-T_{obs}, 0]$$

where:
X(t) is the position of the target along the measurement direction at the instant t belonging to the observation period $[-T_{obs}; 0]$;
g is the displacement model;

$$X(0), \frac{\partial X}{\partial t}(0), \ldots \frac{\partial^i X}{\partial t^i}(0)$$

correspond respectively to the position, the speed, the second derivative, ..., the $i^{th}$ derivative of the position at the instant t=0, at the end of the observation period, the position and the speed corresponding, respectively, to the position and to the speed of the target to be estimated.

2. The sensor as claimed in claim 1, characterized in that the estimator (38) is able to use a sliding observation period shifted temporally by at most $((N-1)/N)*T_{obs}$ with respect to the previous observation period used to estimate the position and the speed of the target.

3. The sensor as claimed in claim 2, characterized in that the sensor comprises an excitation unit (24) suitable for generating the excitation current and voltage in such a way that the spectral energy density of the magnetic excitation field is spread over several frequencies included in a frequency band whose width is at least $2/(N*T_{obs})$, the frequency band containing at least 80% of the energy of the magnetic excitation field.

4. The sensor as claimed in claim 2, in which the amplitude of the electrical measurement signal depends on a multiplicative factor of the position whose value is capable of varying as a function of non-additive defects, characterized in that the sensor comprises:
    at least one second transducer (16) suitable for transforming solely modifications of the magnetic excitation field that are independent of the displacement of the target along the measurement direction (X) into an electrical reference signal, a second estimator (30) suitable for estimating the value of the multiplicative factor on the basis of the electrical reference signal, and a compensator (26) suitable for compensating for amplitude variations in the electrical measurement signal that are caused by variations in the multiplicative factor as a function of the estimated value of the multiplicative factor.

5. The sensor as claimed in claim 1, characterized in that the sensor comprises an excitation unit (24) suitable for generating the excitation current and/or voltage in such a way that the spectral energy density of the magnetic excitation field is spread over several frequencies included in a frequency band whose width is at least $2/(N*T_{obs})$, the frequency band containing at least 80% of the energy of the magnetic excitation field.

6. The sensor as claimed in claim 5, characterized in that the width of the frequency band is at most equal to $2/T_{obs}$.

7. The sensor as claimed in claim 6, characterized in that the excitation unit (24) is able to generate a random or pseudo-random sequence of excitation current and voltage, in such a way that the N samples of excitation current and voltage form a random or pseudo-random series of values, and in that the estimator is able to estimate the position and the speed by projecting a vector $\vec{D}$ formed of N samples of the electrical measurement signal onto at least one vector of a pseudo-inverse matrix of which a term of the form $(M^TM)^{-1}$ is precalculated for several estimates, where M is a matrix, "exponent T" is the matrix transposition function and "exponent −1" is the inverse function.

8. The sensor as claimed in claim 6, in which the amplitude of the electrical measurement signal depends on a multiplicative factor of the position whose value is capable of varying as a function of non-additive defects, characterized in that the sensor comprises:

at least one second transducer (16) suitable for transforming solely the modifications of the magnetic excitation field that are independent of the displacement of the target along the measurement direction (X) into an electrical reference signal, a second estimator (30) suitable for estimating the value of the multiplicative factor on the basis of the electrical reference signal, and a compensator (26) suitable for compensating for amplitude variations in the electrical measurement signal that are caused by variations in the multiplicative factor as a function of the estimated value of the multiplicative factor.

9. The sensor as claimed in claim 5, characterized in that the excitation unit (24) is able to generate a random or pseudo-random sequence of excitation current and/or voltage, in such a way that the N samples of excitation current and/or voltage form a random or pseudo-random series of values, and in that the estimator is able to estimate the position and/or the speed by projecting a vector $\vec{D}$ formed of N samples of the electrical measurement signal onto at least one vector of a pseudo-inverse matrix of which a term of the form $(M^TM)^{-1}$ is precalculated for several estimates, where M is a matrix, "exponent T" is the matrix transposition function and "exponent −1" is the inverse function.

10. The sensor as claimed in claim 9, in which the amplitude of the electrical measurement signal depends on a multiplicative factor of the position whose value is capable of varying as a function of non-additive defects, characterized in that the sensor comprises:

at least one second transducer (16) suitable for transforming solely modifications of the magnetic excitation field that are independent of the displacement of the target along the measurement direction (X) into an electrical reference signal, a second estimator (30) suitable for estimating the value of the multiplicative factor on the basis of the electrical reference signal, and a compensator (26) suitable for compensating for amplitude variations in the electrical measurement signal that are caused by variations in the multiplicative factor as a function of the estimated value of the multiplicative factor.

11. The sensor as claimed in claim 5, in which the amplitude of the electrical measurement signal depends on a multiplicative factor of the position whose value is capable of varying as a function of non-additive defects, characterized in that the sensor comprises:

at least one second transducer (16) suitable for transforming solely modifications of the magnetic excitation field that are independent of the displacement of the target along the measurement direction (X) into an electrical reference signal, a second estimator (30) suitable for estimating the value of the multiplicative factor on the basis of the electrical reference signal, and a compensator (26) suitable for compensating for amplitude variations in the electrical measurement signal that are caused by variations in the multiplicative factor as a function of the estimated value of the multiplicative factor.

12. The sensor as claimed in claim 1, in which the amplitude of the electrical measurement signal depends on a multiplicative factor of the position whose value is capable of varying as a function of non-additive defects, characterized in that the sensor comprises:

at least one second transducer (16) suitable for transforming solely modifications of the magnetic excitation field that are independent of the displacement of the target along the measurement direction (X) into an electrical reference signal, a second estimator (30) suitable for estimating the value of the multiplicative factor on the basis of the electrical reference signal, and a compensator (26) suitable for compensating for amplitude variations in the electrical measurement signal that are caused by variations in the multiplicative factor as a function of the estimated value of the multiplicative factor.

13. The sensor as claimed in claim 12, characterized in that the compensator (26) modifies the magnetic excitation field as a function of a deviation between a reference setpoint and the estimated value of the multiplicative factor.

14. The sensor as claimed in claim 1, characterized in that the first estimator (30) is able to automatically increase the length of the observation period when the estimate of the speed of the target decreases.

15. The sensor as claimed in claim 1, characterized in that the target (12) exhibits a break in conductivity that is not collinear with the measurement direction between two materials of different conductivities.

16. A method for measuring the position and speed of the movable part with the aid of the sensor as claimed in claim 1, characterized in that the method comprises, on completion of the observation period $T_{obs}$, the step (88) of estimating the position and the speed of the movable part on the basis of N samples of the electrical measurement signal and of N samples of the excitation current and/or voltage, these samples being taken during the observation period $T_{obs}$ and N being an integer greater than two, the position and/or speed estimate being dependent on the model of displacement of the target during the observation period, the model linking the position of the target at an instant t included in the observation period to at least the position and the speed to be estimated.

17. The sensor as claimed in claim 1, characterized in that the estimator (38) is able to use a sliding observation period shifted temporally by at most $((N-1)/N)*T_{obs}$ with respect to the previous observation period used to estimate the position and the speed of the target.

18. The sensor as claimed in claim 1, characterized in that the sensor comprises an excitation unit (24) suitable for generating the excitation current and voltage in such a way that the spectral energy density of the magnetic excitation field is spread over several frequencies included in a frequency band whose width is at least $2/(N*T_{obs})$, the frequency band containing at least 80% of the energy of the magnetic excitation field.

19. The sensor as claimed in claim 1, in which the amplitude of the electrical measurement signal depends on a multiplicative factor of the position whose value is capable of varying as a function of non-additive defects, characterized in that the sensor comprises:
- at least one second transducer (16) suitable for transforming solely modifications of the magnetic excitation field that are independent of the displacement of the target along the measurement direction (X) into an electrical reference signal,
- a second estimator (30) suitable for estimating the value of the multiplicative factor on the basis of the electrical reference signal, and
- a compensator (26) suitable for compensating for amplitude variations in the electrical measurement signal that are caused by variations in the multiplicative factor as a function of the estimated value of the multiplicative factor.

* * * * *